United States Patent Office 3,489,130
Patented Jan. 13, 1970

3,489,130
PISTON AND CYLINDER CONSTRUCTION
Harry L. Polidan, Muskegon, Mich., and Norman M. Packard, Des Plaines, Ill.; said Polidan assignor to Sealed Power Corporation, Muskegon, Mich., a corporation of Michigan; said Packard assignor to International Harvester Company, Chicago, Ill., a corporation of Delaware
Filed Jan. 10, 1968, Ser. No. 696,839
Int. Cl. F02b 75/04
U.S. Cl. 123—193          12 Claims

ABSTRACT OF THE DISCLOSURE

A piston and cylinder construction for an internal combustion engine, particularly of the direct, solid injection diesel type, in which the piston carries a set of piston rings in grooves in the ring belt portion of the piston. The ring belt of the piston has the usual radial clearance with the main bore of the cylinder in which the piston reciprocates. However, the head land of the piston from the top ring groove axially upwardly to the crown end of the piston is reduced in diameter as compared to conventional head land dimensioning practices such that the radial clearance between the head land and main bore is on the order of two or three times that of the conventional head land-to-main bore clearance. The upper end of the cylinder bore is reduced in diameter, as by the insertion of a filler ring in a counterbore of the cylinder, for an axial distance generally corresponding to the axial dimension of the piston head land. This reduced diameter or necked down constricted portion of the cylinder fills the unusually large annular clearance between the head land and bore when the piston is at or near top dead center position, thereby causing improved combustion, and the large head land-main bore clearance which is open for most of the compression and power strokes provides better oil control and reduced wear of the piston rings and cylinder.

---

An object of the present invention is to provide an improved piston and cylinder construction which in a very simple and economical manner provides improved engine performance as a result of better combustion and better oil control, and which also increases the life of the piston rings and cylinder bore.

Other objects as well as the features and advantages of the present invention will become apparent from the following detailed description taken in conjunction with the accompanying drawings wherein.

Figure 1:
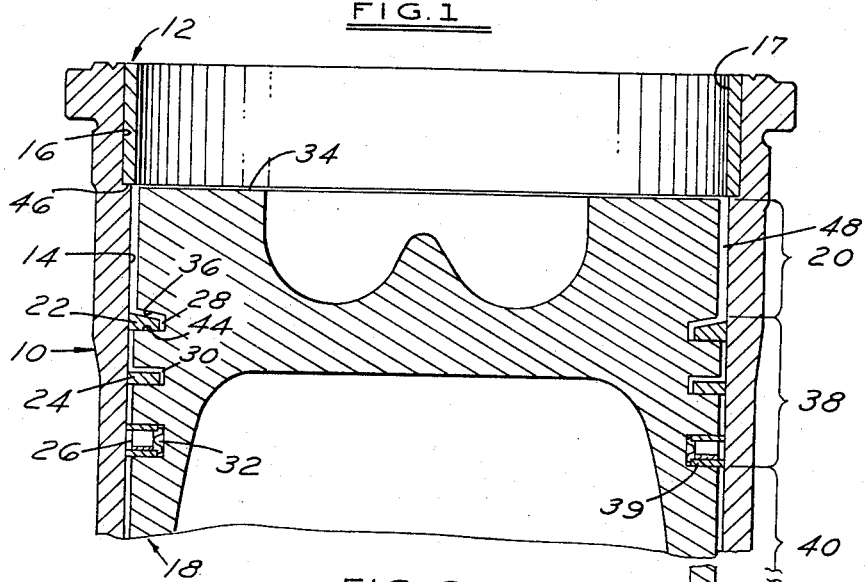
FIG. 1 is a fragmentary vertical center section taken along the axis of a piston and cylinder sleeve assembly constructed in accordance with the present invention, with the piston shown descending on its power stroke.

Referring in more detail to the accompanying drawing, the cylinder construction of the present invention is shown by way of illustration and not by way of limitation embodied in a cylinder sleeve 10 which, except for the ring 12 inserted in its upper end as described hereinafter, is conventional and of the type designed for use as a "wet" sleeve in a diesel engine. The inside diameter of the main bore 14 of the cylinder, as defined by the cylindrical inside wall of sleeve 10, is constant from the lower crankcase end (not shown) of the sleeve up to the junction of bore 14 with a cylindrical coaxial counterbore 16 formed in the upper end of the sleeve. Counterbore 16 receives the cylindrical ring insert 12 which in turn has an internal cylindrical surface 17 of constant predetermined inside diameter less than that of the main cylinder bore.

Figure 2:
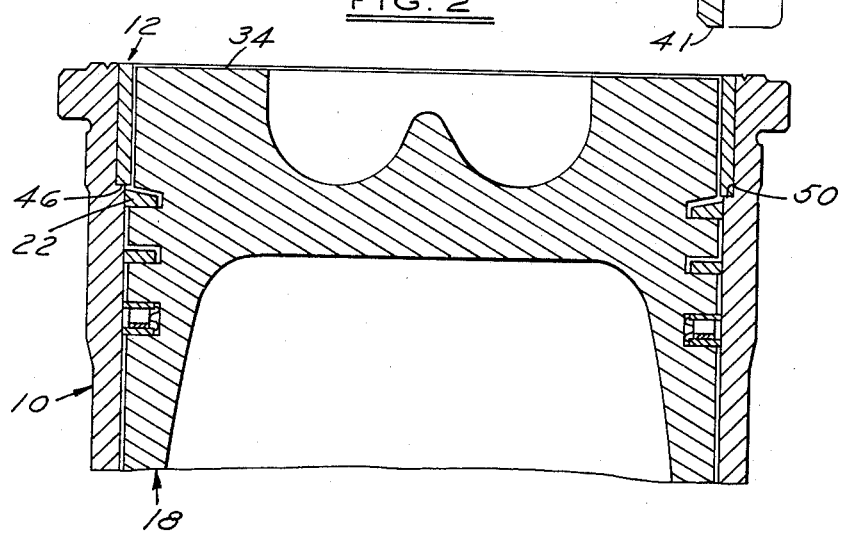
FIG. 2 is a view similar to that of FIG. 1 but with the piston shown more at its top dead center position.

By way of example, FIGS. 1 and 2 illustrate a diesel engine piston 18 embodying the construction of the present invention designed for use in a 4.5 inches nominal diameter cylinder bore. Piston 18 reciprocates in sleeve 10 and has a cylindrical head land 20 (indicated by the bracket in FIG. 1) at the crown end of the piston with an outside diameter which at room temperature is just slightly smaller (e.g., about .040 inch diametrical or .020 inch radial clearance in the case of the aforementioned 4.5 inches diameter bore) than the inside diameter of ring insert 12 to provide an annular expansion clearance which is the same as that normally provided to accommodate differential expansion of the aluminum piston and cast iron cylinder sleeve and insert when the engine temperature rises from cold to running temperature. Piston 18 carries the usual top compression ring 22, middle compression ring 24 and oil control ring assembly 26 in top, middle and lower ring grooves 28, 30 and 32 respectively. Head land 20, as the term is used herein, extends from the top surface 34 of the piston axially downwardly to the upper side wall 36 of groove 28. The ring belt portion 38 of piston 18 extends from wall 36 of groove 28 axially downwardly to the lower side wall 39 of the oil ring groove 32, and the skirt 40 of the piston extends axially downwardly from side wall 39 of groove 32 to the lower end 41 of the piston. Since the diameter of ring belt 38 is larger than the diameter of head land 20, lower side wall 44 extends radially outwardly further than upper wall 36 of groove 28.

The diametrical expansion clearance between ring belt 38 and bore 14 is preferably the usual .030–.036 inch (.015–.018 inch radial) to accommodate piston-cylinder differential expansion. The diametrical expansion clearance between skirt 40 and bore 14 is also preferably in the order of .003–.005 inch (.0015–.0025 inch radial). However, for a diesel engine with a nominal bore diameter of 4.5 inches the diametrical clearance between head land 20 and bore 14 is in the order of .080 inch (.040 inch radial), or about double the usual clearance (.035 inch nominal in the aforementioned example) conventionally provided radially between the piston head land and cylinder bore. Preferably the axial dimension of ring insert 12 is about the same as the axial dimension of head land 20 so that when piston 18 is at top dead center (TDC) position as shown in FIG. 2 the lower end 46 of ring insert 12 just clears the top compression ring 22.

In operation, head land 20 enters ring insert 12 during upward travel of piston 18 from its FIG. 1 position to its FIG. 2 position, which is the last portion of the compression stroke in a two-stroke cycle engine as well as in a four-stroke engine. Hence at this time in the compression stroke ring insert 12 reduces the large head land-main bore clearance from .080 inch to the desired close running clearance when hot. At start up when cold ring insert 12 reduces the .080 inch clearance to the aforementioned 0.40 inch diametrical clearance (.020 inch radial clearance). Insert 12 thus serves to "fill in" what would otherwise be an excessively large clearance space communicating with the combusion chamber at the point of peak compression in the diesel cycle (FIG. 2 TDC position). As soon as piston 18 has been driven downwardly on its power stroke by the exploding fuel-air charge from its TDC position shown in FIG. 2 to the position thereof shown in FIG. 1 (wherein face 34 has just cleared the lower end 46 of ring insert 12), the much larger annular clearance space 48 (.080 inch diametrical) between head land 20 and bore 14 is opened up. Thus at an early point in the downward travel of piston 18 on its power stroke the relatively large annular gas flow path 48 is opened up between the combustion chamber and top groove 28. This annular space remains open as the piston travels downwardly through its bottom dead center position and then upwardly on the compression stroke until the piston again reaches its FIGURE 1 position. Hence the gas pressure build up which occurs on the compression stroke is communicated via space 48 freely and early in the compression stroke to the top ring groove 28, thereby forcing ring 22 against the lower side wall of 44 of groove 28 and thus effecting a better oil seal between ring 22 and its groove. These gases also get behind the inner periphery of ring 22, thereby increasing the radially outwardy directed sealing force exerted by ring 22 against bore 14 through a major portion of its travel on the compression stroke.

It has been found that by providing the annular flow path 48 to the top ring groove, by the simple structural expedient of a reduced diameter head land 20 on the piston, improved engine performance is obtained from the standpoint of better oil control (less oil consumption). Due to the complementary reduction in the diameter of the cylinder bore at its upper end, this improvement in oil control is obtained without sacrificing other engine performance parameters. That is, the constriction provided by ring insert 12 insures good combustion and hence a minimum of smoke by effectively eliminating what would otherwise be an excessive and poorly located clearance space 48 at the critical point in the engine cycle, i.e., during those portions of the piston travel when it is about within 20° (in terms of crankshaft rotation) from its top dead center position and thus slightly before, at the moment of and immediately following ignition.

Moreover, as head land 20 enters ring insert 12, any incipient carbon deposits building up on insert 12 are scraped upwardly into the combustion chamber. In addition, due to the improved combustion carbon build up on the head land is kept to a minimum, thereby further insuring that the flow path 48 to the top ring 22 remains open and that bore scuffing does not occur even under severe engine operating conditions.

The above described cylinder and piston construction has been found to provide better combustion than is obtainable from a piston with a reduced diameter head land used in a cylinder sleeve bore of constant diameter, and has been found to provide better oil control than a piston of constant diameter used in a constant diameter sleeve bore with the usual .040 inch head land-insert diametrical clearance. Also the life of the piston rings and cylinder sleeve is prolonged because debris is kept out of the cylinder.

The same improvement in performance can be obtained by making sleeve 10 in one piece with an integral necked-down upper end in place of the separate ring insert 12 but the two-piece arrangement of sleeve 10 and ring insert 12 is preferred for manufacturing reasons since bore 14 and counterbore 16 can be machined and honed more economically than if there were interference from such a necked-down upper end.

It is also to be understood that in those engines in which cylinder liners or sleeves are not used, a reduced diameter or necked-down upper end may also be provided, preferably by forming a counterbore corresponding to counterbore 16 in the upper end of the cylinder block for receiving a separater ing insert 12. It is also to be understood that ring insert 12 is a circumferentially continuous (not split) ring having a cylindrical inner wall surface. Ring 12 is usually made of cast iron, as is sleeve 10, and is intended to merely serve as a filler of "dead" ring, and does not resiliently engage the piston head land 20 when the two parts are juxtaposed in the engine cycle.

Preferably, ring insert 12 is mounted in sleeve 10 by capturing it between a shoulder 50 (FIG. 2) formed at the junction of bore 14 with counter bore 16 and a lip or other surface on the cylinder head structure (not shown) which overlaps the upper end of ring insert 12. Alternatively, ring 12 may be retained in place by a shrink or press fit in counterbore 16, and may be made of material having a coefficient of expansion slightly higher than that of the material of sleeve 10 (usually cast iron) to insure continuous anchorage of ring insert 12 in counterbore 16.

It is to be understood that various types of compression rings of keystone, rectangular or other cross sectional configuration may be used as the top ring in place of semi-keystone ring 22. Also, the aforementioned ring belt-main bore clearance and skirt-main bore clearance will vary with bore diameter and engine application following conventional piston-cylinder clearance design practice well understood in the art. Further, the head land-insert clearance should in most instances remain the same as noramlly designed into the engine prior to application of the reduced head land and ring insert combination of the present invention. It has been found that the head land-main bore clearance should be in the range of about .070–.080 inch for bore diameters ranging from about 4.25 inches to 5.32 inches nominal. However, larger head land-main bore clearances may be used consistent with proper top ring support and within the acceptable pressure-rise condition of a given engine.

We claim:

1. In an internal combustion engine, a cylinder structure having a bore and a constricted area with an inside diameter less than that of said bore and disposed adjacent the combustion chamber end of said cylinder bore, and a piston working in the bore and having a peripheral head land portion at its upper end of a reduced diameter relative to a ring belt peripheral portion of said piston immediately therebelow, said piston being movable to a top dead center position wherein said land portion and said constricted area juxtaposed, said piston ring belt portion having a ring groove and a piston ring carried therein, said ring groove having an upper wall terminating at its outer edge at an intersection with said head land portion of said piston.

2. The combination set forth in claim 1 wherein the radial clearances between said head land portion of said piston and the juxtaposed constricted area of said cylinder is just sufficient to accommodate differential expansion of said head land portion relative to said constricted area of said cylinder to thereby maintain a close running clearance therebetween.

3. In an internal combustion engine, a cylinder having a bore and means forming a constricted area at the combustion chamber end of said bore and a piston working in the bore and having its combustion chamber end formed of a reduced diameter from the rest of said piston, said combustion chamber end of said piston being adapted to pass with an expansion clearance through the constricted area, said piston having piston rings carried in grooves in the piston, said reduced diameter end of said piston being between said combustion chamber end of said piston and the one of said rings grooves closest thereto, said reducer diameter end of said piston extending down to an intersection with the wall of said one ring groove closest to said combustion chamber end of said piston.

4. The combination set forth in claim 3 wherein said means forming said constricted area comprises a counterbore formed in said cylinder coaxial with said bore thereof adjacent the combustion chamber end of said bore and having a diameter larger than said bore, and a ring insert mounted in said counterbore and having an inner surface adapted to form the inner surface of said constricted area.

5. The combination set forth in claim 4 wherein said ring insert is positioned relative to the travel of said piston in said bore such that the edge of said ring insert remote from the combustion chamber is generally aligned with said wall of said one ring groove when said piston reaches its top dead center position.

6. The combination set forth in claim 5 wherein said ring insert has an axial dimension generally co-extensive with the axial dimension of said head land.

7. In an engine, combination of a cylinder having a restricted area adjacent its combustion chamber end, a piston reciprocable in said cylinder having a ring belt portion and a skirt dependent therefrom, a series of piston ring grooves formed in said ring belt portion, and a head land having an external diameter less than that of said ring belt portion and extending axially from the one of said grooves furthest from said skirt to the crown end of said piston remote from said skirt.

8. In a compression ignition diesel engine, a cylinder having a constricted portion formed at the combustion chamber end of the bore of the cylinder of reduced diameter relative to the major portion of the bore of the cylinder, and a piston reciprocable in the cylinder having a necked down upper part complementary to the reduced diameter constricted portion of the bore, said piston having piston rings carried in ring grooves in the piston including a top ring groove receiving a top ring, said necked down upper part of said piston intersecting an upper wall of said top ring groove.

9. The combination set forth in claim 8 wherein said major portion of said cylinder bore has a nominal diameter on the order of 4.5 inches, wherein said piston is made of aluminum and said cylinder of cast iron, and said diametrical clearance between said necked down upper part of said piston and said reduced diameter minor portion of said cylinder being on the order of .040 inch and the diametrical clearance between said necked down upper part of piston head land and said major portion of said cylinder being on the order of .080 inch.

10. In an internal combustion engine:
a cylinder formed at its upper end with a cross sectional area of reduced diameter from the major portion of the bore;
a piston reciprocable in the cylinder having a necked down upper part complementary to the upper end of the bore, said piston having piston seal rings carried in ring grooves in the piston, and including a top ring groove receiving a top seal ring;
the top land being the part of the piston which is necked down as aforesaid, and which further is prolongated longitudinally of the piston at least past the intersection of the top ring groove with said top land.

11. The invention of claim 10, characterized by:
said prolongated necked down part affording exaggerated piston clearance limited in location to the upper end of the piston;
the piston upper end defining with the major portion of the bore an oversize annular orifice leading direct to the top ring, and adapted to pass, with only restricted clearance, through the reduced cross sectional area whereby, at peak cylinder pressure and at times immediately preceding and subsequent thereto, the pressure is confined to the reduced cross sectional area of the cylinder and piston, but at other times the orifice freely leads cylinder pressure through said piston clearance to gas load the top ring.

12. The invention of claim 11, further characterized by:
the exaggerated clearance defined between the upper end of the piston and the major portion of the bore comprising a generally annular void with substantially uniform inner and outer diameters, the aforesaid reduced diameter of the upper end of the bore closely approximating the just said substantially uniform inner diameter of the void so that the latter is substantially filled with the metal of the upper end of the cylinder when the upper end of the piston occupies the reduced cross sectional area in the upper end of the cylinder bore.

References Cited
UNITED STATES PATENTS

| | | | |
|---|---|---|---|
| 2,170,477 | 8/1939 | Lemasson | 123—193 |
| 2,452,238 | 10/1948 | Hollingsworth | 123—48 |
| 2,624,328 | 6/1953 | Grinham et al. | |
| 2,845,917 | 8/1958 | Laubender. | |
| 3,149,409 | 9/1964 | Maruhn. | |

FOREIGN PATENTS

| | | |
|---|---|---|
| 566,547 | 1/1945 | Great Britain. |
| 828,588 | 2/1938 | France. |
| 41,580 | 1/1916 | Sweden. |

WENDELL E. BURNS, Primary Examiner

U.S. Cl. X.R.

92—169; 123—48